(12) United States Patent
Carlson (10) Patent No.: US 11,385,897 B2
(45) Date of Patent: *Jul. 12, 2022

(54) MERGE EXECUTION UNIT FOR MICROINSTRUCTIONS

(71) Applicant: Marvell Asia Pte, Ltd., Singapore (SG)

(72) Inventor: David A. Carlson, Haslet, TX (US)

(73) Assignee: Marvell Asia Pte, Ltd., Singapore (SG)

( * ) Notice: Subject to any disclaimer, the term of this patent is extended or adjusted under 35 U.S.C. 154(b) by 22 days.

This patent is subject to a terminal disclaimer.

(21) Appl. No.: 16/589,527

(22) Filed: Oct. 1, 2019

(65) Prior Publication Data

US 2021/0096871 A1 Apr. 1, 2021

(51) Int. Cl.
*G06F 9/38* (2018.01)

(52) U.S. Cl.
CPC .......... *G06F 9/3836* (2013.01); *G06F 9/3802* (2013.01); *G06F 9/3818* (2013.01); *G06F 9/3887* (2013.01)

(58) Field of Classification Search
None
See application file for complete search history.

(56) References Cited

U.S. PATENT DOCUMENTS

| | | | | |
|---|---|---|---|---|
| 4,860,219 A * | 8/1989 | Schulz | ............ | G06K 15/02 101/131 |
| 6,079,006 A * | 6/2000 | Pickett | ............ | G06F 9/3832 712/237 |
| 6,535,899 B1 * | 3/2003 | Kuromaru | ............ | G06F 7/76 341/60 |
| 6,697,381 B1 * | 2/2004 | Talbot | ............ | H04L 69/22 370/535 |
| 7,933,405 B2 * | 4/2011 | Knowles | ............ | G06F 9/30036 380/42 |
| 8,346,760 B2 * | 1/2013 | Wang | ............ | G06F 9/3836 712/205 |
| 9,710,269 B2 * | 7/2017 | Dieffenderfer | ............ | G06F 9/30072 |
| 10,009,276 B2 * | 6/2018 | Bosshart | ............ | H04L 45/7453 |
| 11,269,644 B1 * | 3/2022 | Carlson | ............ | G06F 12/0864 |
| 2002/0112149 A1 * | 8/2002 | Moyer | ............ | G06F 9/30174 712/E9.037 |
| 2002/0119803 A1 * | 8/2002 | Bitterlich | ............ | H04L 1/0066 455/552.1 |
| 2003/0126167 A1 * | 7/2003 | Kuromaru | ............ | G06F 7/76 708/209 |
| 2005/0108307 A1 * | 5/2005 | Kuromaru | ............ | G06F 7/76 375/242 |

(Continued)

*Primary Examiner* — Hyun Nam (57) ABSTRACT

A merge unit configured to perform merge and permutation micro-operations by multiplexing data bytes of the inputs to simultaneously produce multiple data bytes of a merge and permutation result. Particularly, the merge unit includes a bank of MUXs arranged in parallel, each corresponding to one or more different data bytes in the merge result. When the merge unit is provided with a set of inputs, each MUX multiplexes the data bytes of the set of inputs (e.g., all the data bytes of the set of inputs) to selectively output a data byte to a particular location of the destination register storing the merge result. The selection by each MUX is individually controlled by a set of merge control words which identify a data byte location in an input and identify an input from the set of inputs.

20 Claims, 5 Drawing Sheets

(56) References Cited

U.S. PATENT DOCUMENTS

| | | | |
|---|---|---|---|
| 2005/0108312 A1* | 5/2005 | Chen | G06F 9/30112 |
| | | | 712/E9.034 |
| 2006/0101319 A1* | 5/2006 | Park | H03M 13/635 |
| | | | 714/755 |
| 2006/0227966 A1* | 10/2006 | Knowles | G06F 9/30043 |
| | | | 712/E9.034 |
| 2006/0265563 A1* | 11/2006 | Goettfert | G06F 12/1408 |
| | | | 711/E12.092 |
| 2007/0258491 A1* | 11/2007 | Reitlingshoefer | H04L 7/033 |
| | | | 370/535 |
| 2009/0129585 A1* | 5/2009 | Lewis | H04L 9/0618 |
| | | | 380/28 |
| 2009/0221289 A1* | 9/2009 | Xu | H04L 5/0053 |
| | | | 455/435.1 |
| 2011/0305286 A1* | 12/2011 | Shimezawa | H04L 27/2646 |
| | | | 375/295 |
| 2013/0294547 A1* | 11/2013 | Lane | H04L 27/2647 |
| | | | 375/340 |
| 2014/0241358 A1* | 8/2014 | Bosshart | H04L 45/7457 |
| | | | 370/392 |
| 2016/0188530 A1* | 6/2016 | San Adrian | G06F 15/8084 |
| | | | 712/7 |
| 2018/0260691 A1* | 9/2018 | Nagaraja | G06N 3/08 |
| 2018/0270154 A1* | 9/2018 | Bosshart | H04L 45/7457 |
| 2019/0227799 A1* | 7/2019 | Chen | G06F 9/30112 |
| 2020/0249955 A1* | 8/2020 | Kravitz | G06F 9/226 |

* cited by examiner

```
┌─────────────────────────────────────────────────────────────┐
│  Fetching an instruction specifying an opcode and operands  │──── 501
└─────────────────────────────────────────────────────────────┘
                              │
                              ▼
┌─────────────────────────────────────────────────────────────┐
│ Decoding the opcode to generate a set of merge control      │
│ indications used to control the select output of the        │──── 502
│ multiplexers of the merge unit                              │
└─────────────────────────────────────────────────────────────┘
                              │
                              ▼
┌─────────────────────────────────────────────────────────────┐
│ Feeding the control merge indications and a set of inputs   │──── 503
│ to the merge unit                                           │
└─────────────────────────────────────────────────────────────┘
                              │
                              ▼
┌─────────────────────────────────────────────────────────────┐
│ Performing the merge micro-operation at the merge unit      │──── 504
│ through multiplexing                                        │
└─────────────────────────────────────────────────────────────┘
                              │
                              ▼
┌─────────────────────────────────────────────────────────────┐
│  Writing back merge result to the destination register      │──── 505
└─────────────────────────────────────────────────────────────┘
```

*FIG. 5*

MERGE EXECUTION UNIT FOR MICROINSTRUCTIONS

TECHNICAL FIELD

Embodiments of the present invention are related to the field of microprocessors, and in particular, to decoding and execution mechanisms for merge and permutation microinstructions in microprocessors.

BACKGROUND OF THE INVENTION

Instruction set architectures defined for various processors commonly include instructions (or microinstructions) involving rearranging or permuting selected or all data elements from multiple inputs and produce a merge and permutation result. For example, certain merge and permutation instructions can be used to load or store data elements from one or more source locations into elements of a destination location with the bytes permutated. In many processing system and applications, especially in large volume data processing, such instructions are repeatedly executed, and in a lot of cases, only some of the data bytes in the result are changed since the last instruction execution. Unfortunately, partially writing a register is impossible in out-of-order machines. Therefore, each byte of a result has to be generated in each instruction execution, even those that do not change since the last instruction execution, which consumes significant processing time and power. It is desirable to reduce latency and power consumption associated with executing these instructions.

SUMMARY OF THE INVENTION

As defined in the corresponding instruction set architecture, certain instructions involve rearranging data elements (e.g., data bytes) of one or more data and output a merge and permutation result to a destination register. These instructions are referred to as "permute and merge instructions" or "merge instructions" and the results from merge and permutation may be referred to as "merge results" herein.

Embodiments of the present disclosure are directed to instruction execution circuits capable of executing instructions involving data element merge and permutation with reduced latency and reduced power consumption.

Embodiments of the present disclosure provide a high efficiency merge execution circuit (or "merge unit" herein) in a processor configured to perform merge and permutation micro-operations by multiplexing the data elements of the inputs to simultaneously produce multiple data elements of a merge and permutation result. Particularly, the merge unit includes a bank of multiplexers (MUXs) arranged in parallel, each MUX corresponding to one or more different data locations (e.g., bytes) in the merge result. When the merge unit is provided with a set of inputs, each MUX multiplexes the data elements of the set of inputs (e.g., all the data bytes of the set of inputs) to selectively output a data element to a particular location of the destination register storing the merge result. The selection is controlled by a set of merge control words which identify a data element location in an input and identify an input from the set of inputs. The set of inputs may include a constant zero value in addition to one or more source operands of the instruction.

Further, some instructions may have multiple operands but only one operand is subject to merge and permutation. In this case, the merge unit may perform merge and permutation on the operand and then supply the merge result for further arithmetic and logic micro-operations along with the other operands.

During operation, once an instruction is fetched, a decoder in the processor decodes the opcode to generate a set of merge control words for supply to the merge unit. In a common scenario, an instruction requires that data elements in the merge result being partially from the source operands of the instruction, partially from previous source operands of a previous instruction, partially from a previous merge result from executing a previous instruction, and/or a zero value. In some embodiments, all the data subject to merge and permutation per an instruction may be fed to the merge unit in successive sets of inputs. For example, in each merge micro-operation and by the select control of the set of merge control words, the bank of MUXs multiplexes the data elements of two inputs to output a set of selected data elements in the merge result.

In some embodiments, the merge control words may be used to control the multiplexers to (1) select data elements from the two inputs to form the result, and (2) select which data element of the result are provided from the first input, the second input, or a zero value.

A merge unit according to embodiments of the present disclosure can be used to execute single-instruction-multiple-data (SIMD) floating point permute instructions, SIMD integer permute instructions, and non-SIMD floating point permute instructions. A bank of MUXs is used in combination with a set of control words to implement a merge micro-operation. The merge control words can directly and individually control the output of each data element of the merge result by imposing select control on each of the MUXs. As a result, multiple data elements in a merge result can be advantageously generated simultaneously in one merge micro-operation. Thus the total number of micro-operations need to obtain a final result can be significantly and advantageously reduced, which leads to fast speed and low latency of the processor.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying figures, in which like reference characters designate like elements.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the following detailed description of embodiments of the present invention, numerous specific details are set forth in order to provide an understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Merge Execution Unit for Microinstructions

Embodiments of the present disclosure provide systems and methods for executing merge and permutation microinstructions in a microprocessor by virtue of multiplexing, which allows generation of a merge result with a fast speed. An exemplary merge unit includes a bank of multiplexers (MUXs) configured to multiplex the data units of a set of inputs and simultaneously output multiple data elements of the merge result in selected data locations (e.g., selected data bytes) in one merge micro-operation. The MUXs are controlled by a set of merge control words which can be generated as a result of decoding the instruction. For executing an instruction, all the input data subject to merge and permutation can be fed to the merge unit simultaneously or in successive sets of inputs. In such a merge micro-operation, the merge control words may individually control a specific MUX to select a byte and output to the destination register in a particular byte location. As a result, a merge result can be obtained, which includes data elements selected from the input data and rearranged according to the instruction.

Figure 1:
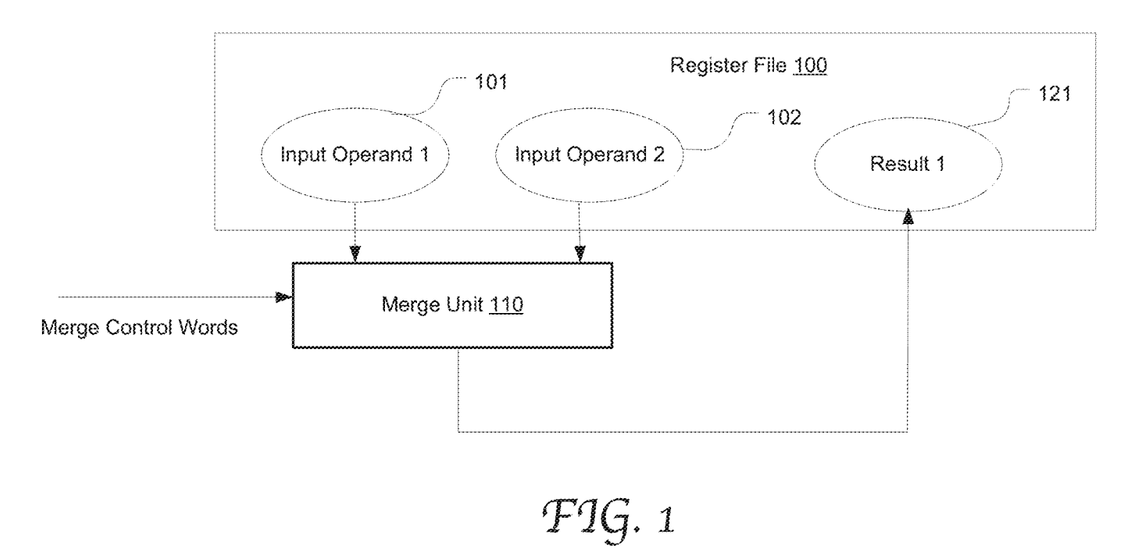
FIG. 1 illustrates the flow of data in execution of a merge and permutation micro-operation by using an exemplary merge unit in accordance with an embodiment of the present disclosure.

FIG. 1 illustrates the flow of data in execution of a merge and permutation micro-operation by using an exemplary merge unit 110 in accordance with an embodiment of the present disclosure. The merge micro-operation may be one of a set of micro-operations resulting from decomposing a machine instruction. The register file 100 may be a floating point register file and includes registers 101 and 102 for storing the input operands. The two input operands and a set of merge control words are input to the merge unit 110. In some other embodiments, the merge unit may receive three or more input operands. For example, the registers may be 64 or 128 bits wide.

Selected data bytes are permuted or rearranged to output the merge result 121 to a destination register. The merge result typically has the same width as the inputs, but can also be narrower or wider. For instance, the two input operands are represented by "AB" and "CD" (each letter represents a byte) respectively, and fed to the merge unit which performs merge and permutation to output a single merge result, e.g., represented as "AC" or "BD."

In this example, assuming the merge result is composed of data bytes only selected from the two source operands as shown. According to embodiments of the present disclosure, the merge unit is capable of performing merge and permutation on the inputs to generate all the data bytes in the merge result in one micro-operation. A set of merge control words that are specific to the instruction are fed to the merge unit to control the selection of data bytes during the micro-operation. According to embodiments of the present disclosure, the set of merge control words can flexibly and individually control the output (or non-output) of each data byte in the merge result, thereby advantageously.

The merge unit 110 is also capable of performing merge micro-operation on only one operand of an instruction, optionally with the zero value. The merge result may be supplied for further micro-operations in combination with other operands.

Although embodiments of the present disclosure are described in detail with reference to merge and permutation in the unit of data byte, it will be appreciated that merge and permutation can be performed in any suitable data unit or data element (e.g., bit or byte) without departing from the scope of the present disclosure.

For example, a merge unit according to embodiments of the present disclosure can be used to execute single-instruction-multiple-data (SIMD) floating point instruction, SIMD integer instructions, and non-SIMD floating point instructions. Examples of instructions that can be executed or facilitated by the merge unit include, but not limited to, load/stored instructions (e.g., "LDn," "STn," single or multiple variants), "LDnR," SIMD permute operations, vector table look up instructions (e.g., "TBL,") vector table extend instructions (e.g., "TBX").

Figure 2:
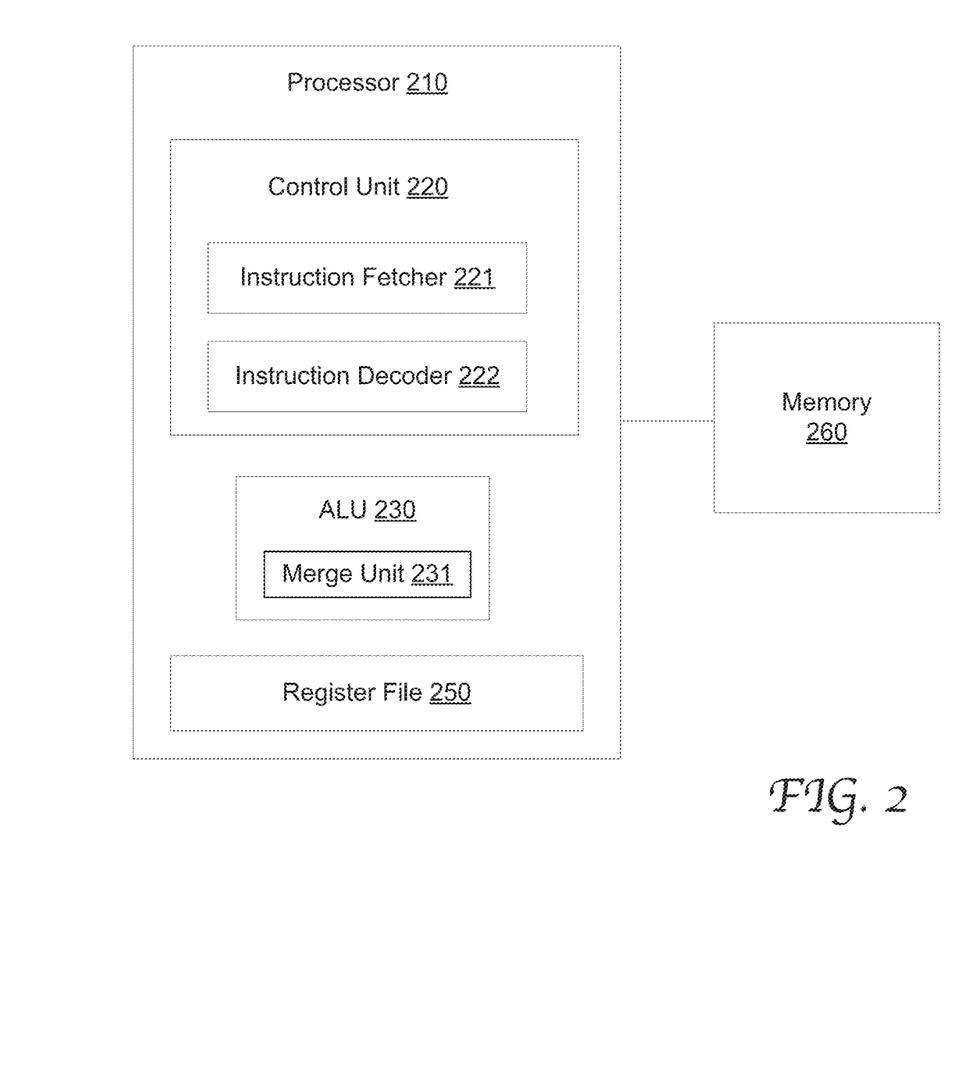
FIG. 2 illustrates the components in a microprocessor configured to execute an instruction by using an exemplary merge unit in accordance with an embodiment of the present disclosure.

FIG. 2 illustrates the components in a microprocessor 210 configured to execute an instruction by using an exemplary merge unit 231 in accordance with an embodiment of the present disclosure. The processor 210 has a control unit 220 including a fetcher 221 and decoder 222, an arithmetic and logic unit (ALU) 230, and a register file 250. It will be appreciated that the processor 210 may include a wide range of other components that are well known in the art.

During operation, in an opcode fetch cycle, the instruction fetcher 221 fetches the opcode stored in the memory 260 based on the opcode address specified in the instruction. The instruction decoder 222 decodes the opcode, which generates a set of merge control words used to control selection and rearrangement of bytes from the inputs to form the desired merge result. The decoding from the instruction to the merge control words may be a function of several factors, including the type of instruction, the size of the vector elements (e.g., 8-bit, 16-bit, 32-bit or 64-bit), and the length of the input operands and results (e.g., 64-bit or 128-bit). In a memory read cycle, the processor reads one or more input operands from the memory and stores them in the register file 250.

The control unit 220 sends the operands from the register file 250 to the merge unit 231, along with the merge control words. As described in greater detail with reference to FIG. 3, the merge unit includes a bank of MUXs configured to multiplexing the data bytes of the inputs based on the control words and simultaneously output multiple, or all the, data bytes of the merge result in the desired arrangement. In a write back cycle, the ALU 230 writes the merge result to a destination register in the register file 250. The processor 210 may be an in-order or out-of-order processor. It will be appreciated that the merge unit 231 may execute a sequence of merge micro-operations that originate from related or unrelated instructions.

In some use case scenarios, multiple data fed to the merge unit input are just the source operands specified in the instruction. However, the present disclosure is not limited thereto. In some other scenarios, an instruction may require that a merge result includes data bytes from the current source operands, previous source operands of a previous instruction executed by the merge unit, the previous merge result, and/or a zero value. In some embodiments, all the data subject to merge and permutation per the instruction can be fed to the merge unit in successive sets of inputs and each set including 2 or more inputs. Thus, in each merge micro-operation, the bank of MUXs multiplexes the data elements of two or more inputs to output a plurality of selected data bytes in the merge result.

Through a load micro-operation, the register file 250 may read the data directly from the memory 260 (e.g., a specified source operand in the instruction) as an input to the merge unit. In some embodiments, the data stored in the destination register of the previous merge micro-operation may be directly supplied as an input to the merge unit for the current merge micro-operation. In this case, an input operand newly loaded from the memory can be multiplexed with the previous merge result.

Figure 3:
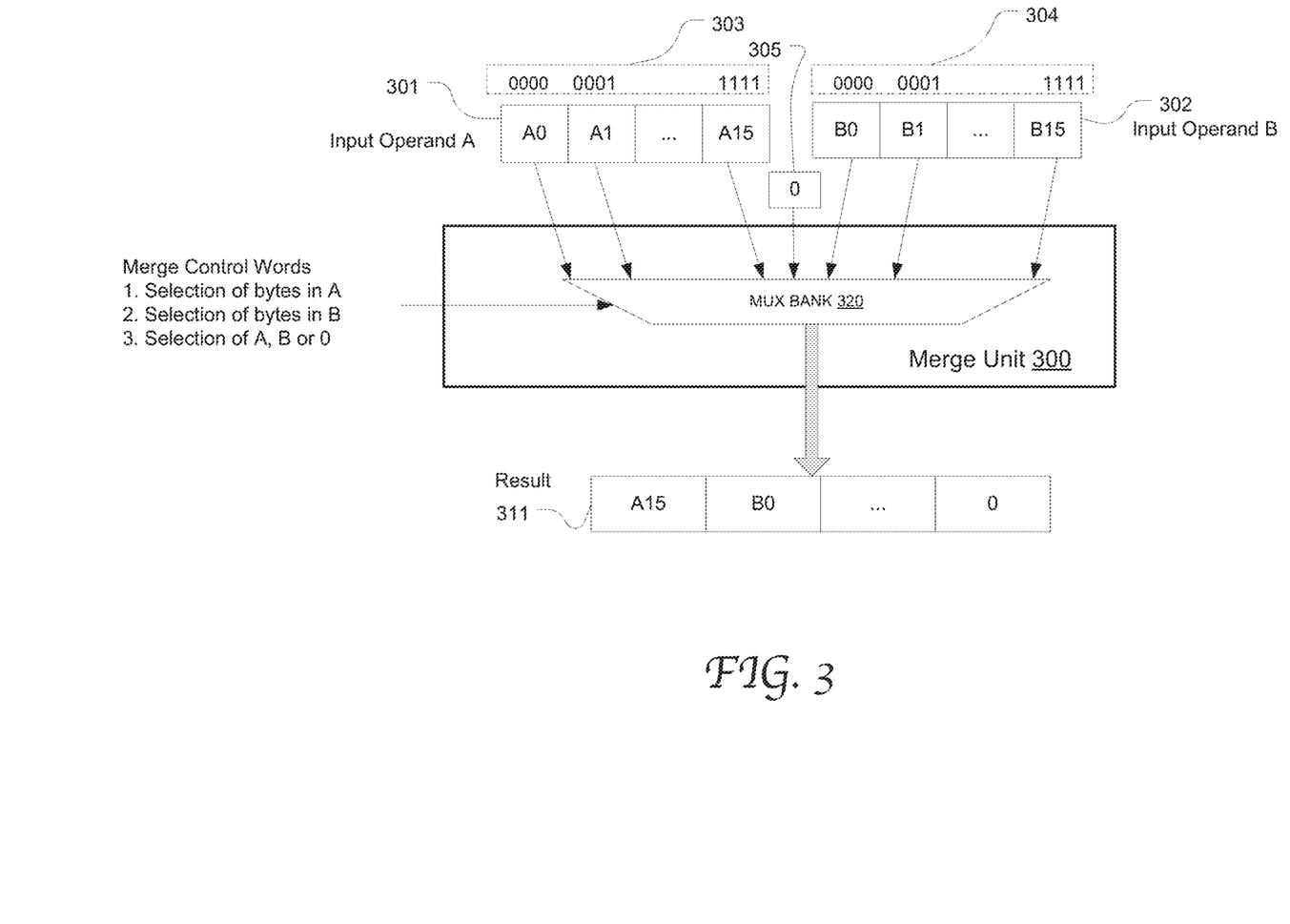
FIG. 3 illustrates the usage of an exemplary merge unit in combination with exemplary merge control words in performing a merge micro-operation in accordance with an embodiment of the present disclosure.

FIG. 3 illustrates the usage of an exemplary merge unit in combination with exemplary merge control words in executing a merge micro-operation in accordance with an embodiment of the present disclosure. The two input operands A 301 and B 302 each have 16 bytes. In this example, a constant zero value (e.g., 1 byte 305) is also input to the merge unit 300. Each input A, B or "0" is associated with a control value. Further, each byte position in an operand is associated with a 4-bit control value (control values 303 and 304). For example, the most significant position is associated with a value of "1111" and the least significant position is associated with "0000." It will be appreciated that these numbers are merely exemplary; the control values can be defined in any suitable format.

In this embodiment, a set of merge control words generated by the decoder may include: (1) one pair of merge control words selecting the bytes from the two inputs to form the result; and (2) the remaining control word selecting which byte of the result are fed from the first input A, the second input B, or a zero value (neither A or B). The three control words in combination can directly and individually control the output for each byte location in the merge result 311.

However, this discussion is merely exemplary; any other definition of control indications can be used to enable merge and permutation by using a bank of MUXs without departing from the scope of the present disclosure. Further, it will be appreciated that the present disclosure is not limited to any specific configurations, structures, components and methods used to implement the decoding mechanism.

In some embodiments, the MUX bank 320 may include 16 33:1 MUXs arranged in parallel. Each MUX has 33 inputs respectively corresponding to the 33 bytes of A 301, B 302 and the zero byte combined, and each MUX supplies a respective output byte of the merge result. Depending on the instruction, A and B may be both loaded from the memory to the register file for the merge micro-operation; or A and/or B may be pre-existent in the register file without requiring a load micro-operation. For instance, A is loaded to the register file from the memory while B is the value in a previous destination register and therefore is already existent in the register file. In this configuration, the 33 input bytes can be merged and permuted to generate the merge result in a single micro-operation cycle.

In some other embodiments, a merge unit is configured to merge at most 17 bytes in one micro-operation and includes 16 17:1 MUXs arranged in parallel. For example, each MUX has 17 inputs respectively corresponding to the 16 bytes of an input and the constant zero byte. Each MUX supplies a respective output byte to a destination register. The merge result may be supplied for further execution in the ALU with the other operands of the instruction. It will be appreciated that the present disclosure is not limited to any specific sizes of the MUXs in a merge unit, nor limited to any specific number of MUXs in a merge unit. Further, a processor may include multiple merge units of different configurations, e.g., used for executing different types of instructions.

Figure 4:
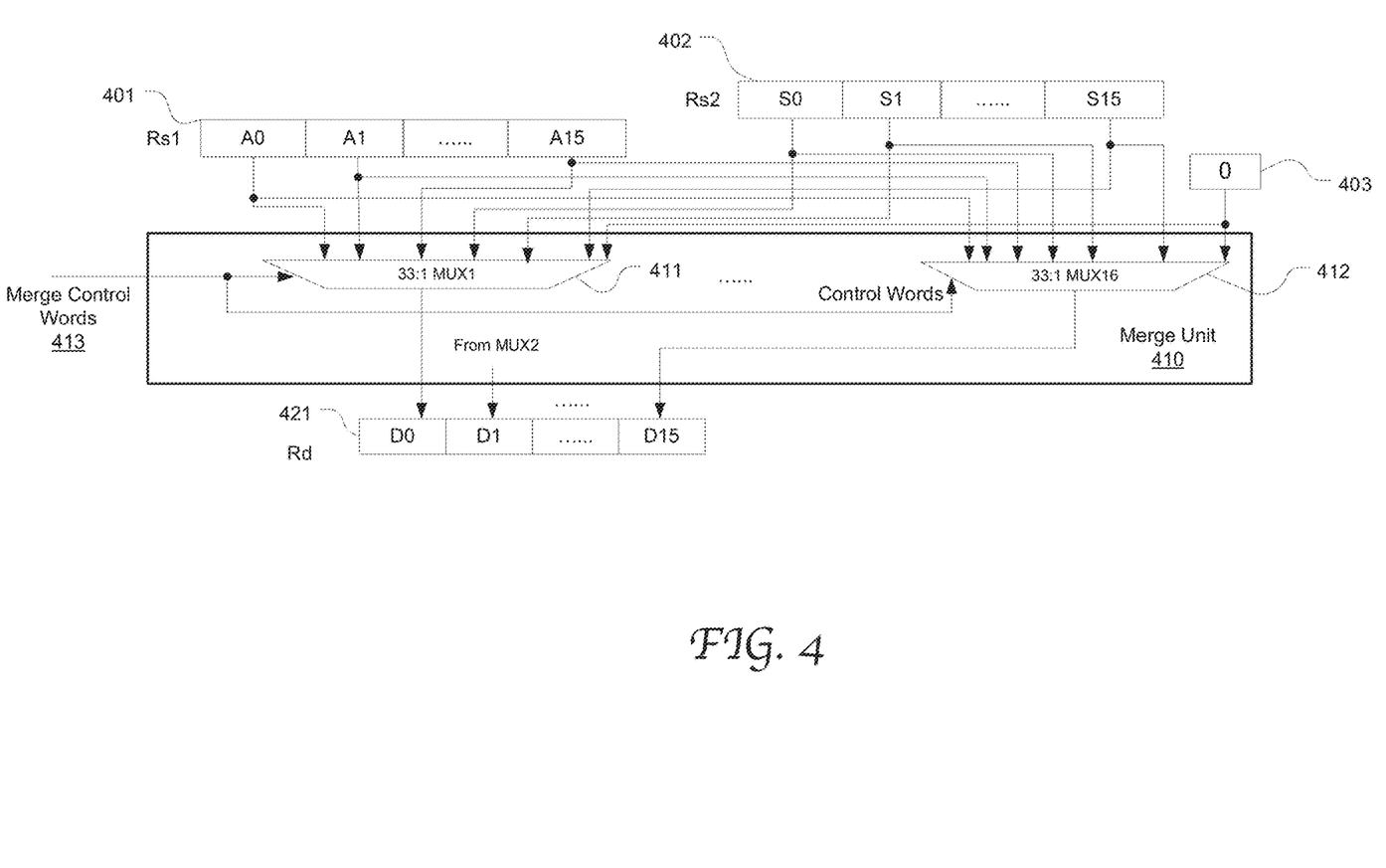
FIG. 4 illustrates the circuitry configuration of an exemplary merge unit capable of merging and permuting data elements by virtue of multiplexing in accordance with an embodiment of the present disclosure.

FIG. 4 illustrates the circuitry configuration of an exemplary merge unit 410 capable of merging and permuting data elements by virtue of multiplexing in accordance with an embodiment of the present disclosure. The merge unit includes a bank of MUXs (e.g., MUX 411 or 412) arranged in parallel. In the illustrated example, the merge unit is configured to merge and permute two input operands in each merge micro-operation, and each input operand has 16 bytes. The input operands are stored in the input registers Rs1 401 and Rs2 402.

As noted above, an input operand stored in the input register Rs1 or Rs2 can be a source operand newly loaded from the memory, an input to the merge unit in the previous merge micro-operation, the existing value of the register, or the previous merge result stored in the previous destination register, and etc. The sources of data subject to merge and permutation depend on the definitions and specifications of particular instructions. In each merge micro-operation, the bank of MUXs multiplexes the data bytes of two inputs to output a set of selected data elements in the merge result. In some other embodiments, the two input data respectively correspond to two sections of a single source operand, e.g., upper bytes and lower bytes of the operand.

Each MUX is 33:1 and is individually controlled by the merge control word to select one byte from all the 33 input data bytes 401~403. The selected byte from the MUX is output to a particular location in the destination register Rd 421. In a merge micro-operation, the 16 MUXs are responsible for different byte locations in the destination register. As shown, MUX1 411 receives as input all 33 data bytes of the source operand A and another input S (e.g., the value in the previous destination register). The merge control words 413 are fed to the select lines of MUX1 411 and control the selection from the 33 bytes for the output byte D0 in the register Rd 421. Similarly, MUX16 receives the same 33 inputs bytes and the merge control words 413 to select a byte for output to the byte D15 in the register Rd 421. As a result of this merge and permutation micro-operation on the set of inputs A, S and "0," multiple bytes of the merge result can be obtained. Thereafter, another set of inputs may be supplied to the merge unit 410 for the next merge micro-operation, and the MUXs output one or more bytes to the same destination register Rd or to another destination register. The two contiguous merge micro-operations may be executed for the same instruction or different instructions.

By using a bank of MUXs in combination with the control words, multiple data elements in a merge result can be advantageously generated and stored to the destination register simultaneously in one micro-operation cycle. Thus the total number of micro-operations need to obtain a final result can be significantly and advantageously reduced, which leads to fast speed and low latency of the processor.

It will be appreciated that a merge unit according to embodiments of the present disclosure may be implemented in various other suitable configurations, and may include a range of other suitable components that are well known in the art without departing from the scope of the present disclosure. Each MUX may be implemented in any suitable manner that is well known in the art, e.g., a MUX tree. The present disclosure is not limited to any specific number of inputs or data bytes that a merge unit can process in one merge and permutation micro-operation. Nor is it limited any specific number of load-execution cycles to obtain a merge result, or any specific number of data elements that can be produced in one merge micro-operation.

Figure 5:
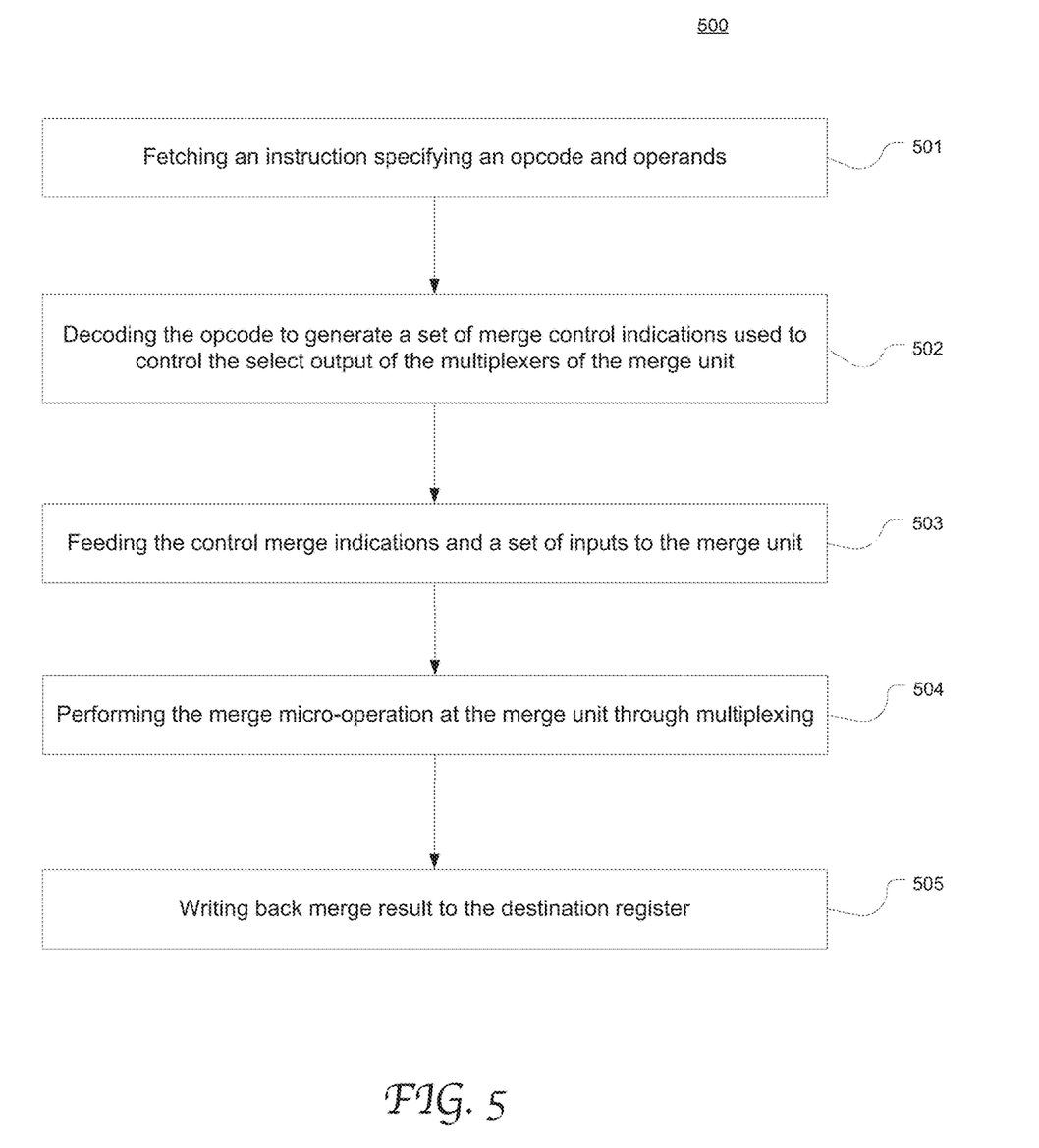
FIG. 5 is a flow chart depicting an exemplary process of executing an instruction by using an exemplary merge unit in accordance with an embodiment of the present disclosure.

It will be appreciated that a merge unit according to embodiments of the present disclosure can be used in different processes for purposes of executing or facilitating various machine instructions. FIG. 5 is a flow chart depicting an exemplary process 500 of executing an instruction by using an exemplary merge unit in accordance with an embodiment of the present disclosure. Process 500 can be performed by a processor including an exemplary merge unit, as shown in FIG. 2 for example. The merge unit includes a bank of multiplexers arranged in parallel and configured to selectively output multiple permuted bytes in a single micro-operation according to a set of merge control indications, where the merge control indications are specific to the instruction.

More specifically, at 501, the instruction is fetched from the memory which specifies an opcode and operands. The instruction requires merge and permutation of one or more of the operands. At 502, the opcode is decoded, which generates a set of merge control indications used to control the merge unit to produce a desired merge result. Particularly, the control indications are operable to control multiplexing of input data bytes and selective output of the data bytes as the merge result.

At 503, the merge control indications and a set of inputs are fed to the merge unit. For example, there are multiple inputs to the merge unit, each input comprising multiple bytes. Accordingly, the control indications indicate (1) the byte locations from the multiple inputs to form the result; and (3) which bytes of the result are fed from the first input, the second input, 0, or none of the inputs. The multiple inputs may include an operand loaded from the memory, or the data pre-existing in a register, e.g., a destination register of a previous merge micro-operation.

At 504, the merge unit executes the merge and permutation micro-operation on the multiple inputs through multiplexing, where the multiplexers are controlled by the control indications, as described in greater detail with reference to FIGS. 3-4. At 505, the merge result is written back to the destination register.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law. Any claimed embodiment of the invention does not necessarily include all of the objects or embodiments of the disclosure.

What is claimed is:

1. A method of executing machine instructions in a processor, said method comprising:
   fetching an instruction comprising an opcode and a set of operands;
   decoding said opcode to generate a set of merge control words;
   feeding a first set of inputs and said set of merge control words to a merge execution unit comprised in said processor, wherein said first set of inputs comprises at least a first operand of said set of operands, and wherein said set of merge control words controls said merge execution unit to select data units from said first set of inputs; and
   generating, by said merge execution unit, a merge result comprising a first plurality of data units comprising the selected data units, wherein said generating comprises permuting said selected data units, and wherein said permuting comprises using said set of merge control words to multiplex said selected data units.

2. The method of claim 1, wherein said set of merge control words is operable to:
   control said merge execution unit to identify a select input from said first set of inputs; and
   control a multiplexer to identify a select data unit from said select input as a data unit of said first plurality of data units.

3. The method of claim 1, wherein said permuting comprises multiplexing said selected data units of said first set of inputs to simultaneously generate said first plurality of data units.

4. The method of claim 1, further comprising:
   loading said first operand as a first input of said first set of inputs; and
   supplying a previous input to the merge execution unit as a second input of said first set of inputs, wherein said previous input was supplied to said merge execution unit in a previous micro-operation.

5. The method of claim 1, wherein said merge result further comprises a second plurality of data units, and wherein said method further comprises:
   following said permuting, feeding a second set of inputs to said merge execution unit following generating of said first plurality of data units, wherein said second set of inputs comprises a previous source operand of a previous instruction; and
   based on said set of merge control words, generating, by said merge execution unit, said second plurality of data units of said merge result by multiplexing data units from said second set of inputs.

6. The method of claim 1, wherein said instruction is one of: a single instruction multiple data (SIMD) floating-point merge and permute instruction;
   and an SIMD integer merge and permute instruction.

7. The method of claim 3, further comprising:
   successively providing additional sets of inputs to said merge execution unit, wherein each set of inputs of said additional sets of inputs comprises: an operand of said set of operands, and a previous operand or a previous merge result, and wherein said previous merge result is obtained from said merge execution unit executing a previous instruction; and provided with each set of inputs of said additional sets of inputs and based on said merge control words, generating, by said merge execution unit, a respective plurality of data units of said merge result by multiplexing data units of said set of inputs.

8. A processor configured to execute instructions, said processor comprising:
   a fetcher configured to fetch an instruction comprising an opcode and a set of operands;
   a decoder coupled to said fetcher and configured to decode said opcode to generate a set of merge control words; and
   a merge execution unit coupled to said decoder and comprising a bank of multiplexers arranged in parallel and configured to: i) receive a first set of inputs comprising at least one operand of said set of operands, ii) select data units from said first set of inputs according to said set of merge control words, and iii) multiplex the selected data units according to said set of merge control words, to generate a merge result that comprises a plurality of data units comprising said selected data units.

9. The processor of claim 8, wherein each multiplexer of said bank of multiplexers is configured to output a different data unit of said merge result.

10. The processor of claim 8, wherein said first set of inputs collectively comprises N data units and said merge result comprises M data units, wherein N and M are integers greater than 1, wherein said bank of multiplexers comprises M multiplexers, and wherein further each multiplexer of said bank of multiplexers is configured to receive said N data units and selectively output a respective data unit of said M data units.

11. The processor of claim 8, wherein said first set of inputs comprises a previous input to said merge execution unit during execution of a previous instruction.

12. The processor of claim 10, wherein said N data units comprise a constant "0" value independent of said set of operands.

13. The processor of claim 8, wherein said merge execution unit is configured to generate said merge result by further performing:
   successively receiving additional sets of inputs, wherein said additional sets of inputs comprise said set of operands; and
   provided with each set of inputs of said additional sets of inputs and based on said set of merge control words, generating a respective plurality of data units of said merge result by multiplexing.

14. The processor of claim 8, wherein said set of merge control words is operable to:
   control each multiplexer of said bank of multiplexers to identify a select input from said first set of inputs; and
   control said multiplexer to identify a select data unit from said select input as a data unit of said plurality of data units,
wherein said decoder is configured to generate said set of merge control words based on at least one of: said opcode; a size of vector elements; a length of each of said set of operands; and a length of said merge result.

15. The processor of claim 8, wherein said merge execution unit is configured to execute single instruction multiple data (SIMD) floating-point merge and permute instructions; and SIMD integer merge and permute instructions.

16. A system comprising:
   a memory; and
   a processor coupled to said memory and comprising:
      a fetcher configured to fetch an instruction comprising an opcode and a set of operands;
      a decoder coupled to said fetcher and configured to decode said opcode to generate a set of merge control words; and
      a merge execution unit coupled to said decoder and comprising a bank of multiplexers arranged in parallel, and configured to: i) receive a first set of inputs comprising at least one operand of said set of operands, ii) select data units from said first set of inputs according to said set of merge control words, and iii) multiplex the selected data units according to said set of merge control words, to generate a merge result that comprises a plurality of data units comprising said selected data units.

17. The system of claim 16, wherein each multiplexer of said bank of multiplexers is configured to output a different data unit of said merge result.

18. The system of claim 16, wherein said first set of inputs collectively comprises N data units and said merge result comprises M data units, wherein N and M are integers greater than 1, wherein said bank of multiplexers comprises M multiplexers, and wherein further each multiplexer of said bank of multiplexers is configured to receive said N data units and selectively output a respective data unit of said M data units.

19. The system of claim 18, wherein said N data units comprise a constant "0" value independent of said set of operands.

20. The system of claim 16, wherein said decoder is configured to generate said set of merge control words based on at least one of: said opcode; a size of vector elements; a length of each of said set of operands; and a length of said merge result.

* * * * *